(12) United States Patent
Kyrtsos et al.

(10) Patent No.: US 10,114,113 B2
(45) Date of Patent: Oct. 30, 2018

(54) ULTRASOUND RANGE CORRECTION

(71) Applicant: Ford Global Technologies, LLC, Dearborn, MI (US)

(72) Inventors: Christos Kyrtsos, Beverly Hills, MI (US); Peter Gyumyeong Joh, Bloomfield Hills, MI (US); Gerald H. Engelman, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 260 days.

(21) Appl. No.: 15/058,275

(22) Filed: Mar. 2, 2016

(65) Prior Publication Data
US 2017/0254886 A1  Sep. 7, 2017

(51) Int. Cl.
| | |
|---|---|
| G05D 1/02 | (2006.01) |
| G01S 7/52 | (2006.01) |
| G01S 13/08 | (2006.01) |
| G01S 15/08 | (2006.01) |
| G01S 13/86 | (2006.01) |
| G01S 13/93 | (2006.01) |

(52) U.S. Cl.
CPC ........ *G01S 7/52004* (2013.01); *G01S 13/08* (2013.01); *G01S 13/862* (2013.01); *G01S 13/931* (2013.01); *G01S 15/08* (2013.01); *G05D 1/0255* (2013.01); *G05D 1/0257* (2013.01); *G01S 7/52006* (2013.01); *G01S 2013/9375* (2013.01); *G01S 2013/9389* (2013.01); *G05D 2201/0212* (2013.01); *G05D 2201/0213* (2013.01)

(58) Field of Classification Search
CPC ........ G01S 15/931; G01S 13/02; G01S 15/02; G01S 15/08; G01S 15/46; G01S 15/872; G01S 17/02; G01S 2015/465
See application file for complete search history.

(56) References Cited

U.S. PATENT DOCUMENTS

| | | | | |
|---|---|---|---|---|
| 5,206,652 A | * | 4/1993 | Hoyt | G01S 15/10 342/52 |
| 5,754,123 A | * | 5/1998 | Nashif | B60Q 9/007 340/435 |
| 6,104,671 A | * | 8/2000 | Hoyt | G01S 15/58 367/124 |

(Continued)

FOREIGN PATENT DOCUMENTS

| | | |
|---|---|---|
| DE | 19722180 A1 | 12/1998 |
| DE | 102011112243 A1 | 5/2012 |
| EP | 0247375 A2 | 12/1987 |

OTHER PUBLICATIONS

UK Search Report 16744P; GB Appl. 1703305.1; May 19, 2017; 3 pages.

*Primary Examiner* — Jaehwan Oh
(74) *Attorney, Agent, or Firm* — Frank A. MacKenzie; Bejin Bieneman PLC

(57) ABSTRACT

A vehicle system includes a processor having a memory. The processor is programmed to receive a first distance signal output by a radar sensor and calibrate an ultrasound sensor in accordance with the first distance signal output by the radar sensor. A method includes receiving a first distance signal output by a radar sensor, receiving a second distance signal output by an ultrasound sensor, and calibrating the ultrasound sensor in accordance with the first distance signal output by the radar sensor.

17 Claims, 3 Drawing Sheets

(56) References Cited

U.S. PATENT DOCUMENTS

| | | |
|---|---|---|
| 6,314,380 B1 | 11/2001 | Seip et al. |
| 6,431,592 B2 | 8/2002 | Seip |
| 6,470,286 B1 | 10/2002 | Seip et al. |
| 6,782,332 B2 | 8/2004 | Seip et al. |
| 7,266,477 B2 | 9/2007 | Foessel |
| 7,567,168 B2 | 7/2009 | Li |
| 7,710,829 B2 | 5/2010 | Wei et al. |
| 2002/0177935 A1* | 11/2002 | Winner ............. B60K 31/0008 701/93 |
| 2007/0124106 A1* | 5/2007 | Gotzig .................. G01S 15/46 702/150 |
| 2008/0266052 A1* | 10/2008 | Schmid ............... G01S 7/52004 340/5.1 |
| 2014/0247352 A1* | 9/2014 | Rathi ........................ B60R 1/00 348/148 |
| 2014/0300504 A1 | 10/2014 | Shaffer et al. |
| 2015/0217688 A1* | 8/2015 | Schneider ............ G01G 19/086 73/117.03 |

\* cited by examiner

Initial Ultrasound Sensor Calibration

| Radar Distance (m) | Ultrasound Distance (m) | Correction Factor | Calibrated Ultrasound Distance (m) |
|---|---|---|---|
| 1.00 | 1.05 | 0.95 | 1.00 |
| 1.10 | 1.16 | 0.95 | 1.10 |
| 1.20 | 1.26 | 0.95 | 1.20 |
| 1.30 | 1.37 | 0.95 | 1.30 |
| 1.40 | 1.47 | 0.95 | 1.40 |
| 1.50 | 1.58 | 0.95 | 1.50 |

FIGURE 6A

Updated Ultrasound Sensor Calibration

| Radar Distance (m) | Ultrasound Distance (m) | Correction Factor | Calibrated Ultrasound Distance (m) |
|---|---|---|---|
| 1.00 | 1.05 | 0.95 | 1.00 |
| 1.10 | 1.16 | 0.95 | 1.10 |
| 1.10 | 1.18 | 0.93 | 1.10 |
| 1.20 | 1.29 | 0.93 | 1.20 |
| 1.20 | 1.29 | 0.93 | 1.20 |
| 1.10 | 1.18 | 0.93 | 1.10 |

FIGURE 6B

ULTRASOUND RANGE CORRECTION

BACKGROUND

Modern vehicles include many sensors that help a driver operate the vehicle. In some instances, the sensors can be used to operate the vehicle in a partially or fully autonomous mode. For example, in an autonomous or partially autonomous vehicle, sensor outputs may identify objects in the path of the vehicle, identify lane markers, and so on.

BRIEF DESCRIPTION OF THE DRAWINGS

FIGS. 6A and 6B illustrate an example database showing an initial calibration and an updated calibration under various example circumstances.

DETAILED DESCRIPTION

Figure 1:
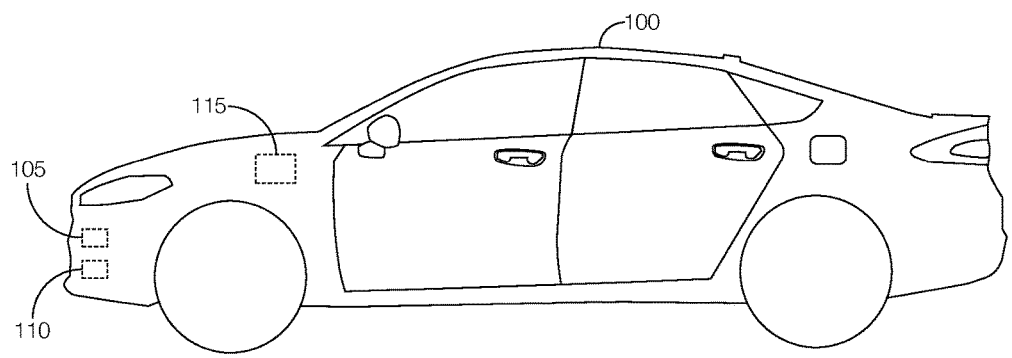
FIG. 1 illustrates an example vehicle with a system for calibrating an ultrasound sensor based on the output of a radar sensor.

Vehicles are subject to a wide range of environmental factors. Vehicles operate in low temperatures, high temperatures, low humidity, and high humidity environments, among many others. Vehicle sensors may be subject to various environmental factors. That is, certain environmental factors may change how certain sensors take certain readings. For example, ambient humidity may affect readings from an ultrasound sensor.

In a vehicle, ultrasound may be used to determine the distance of an object relative to the vehicle. The ultrasound sensor transmits a sound wave that is reflected off of the object. The ultrasound sensor may output a signal indicating that the distance of the object is a function of the speed of sound and the amount of time for the sound wave to reach the object and to be reflected back to the ultrasound sensor. This assumes, however, that sound waves always travel at a constant speed of sound. Environmental factors may affect how sound travels through a medium. For instance, high temperature may cause sound waves to travel faster than what would be expected at lower temperature levels. While the affect of environmental factors may be low, they may be significant enough to warrant adjustment when used in vehicles, especially of autonomous vehicles.

A radar sensor is not affected by the same environmental factors as an ultrasound sensor. That is, the way that a radar sensor measures distance to an object is independent of transmitting sound waves and receiving sound waves generated by the ultrasonic sensor. Rather than eliminate the ultrasound sensor altogether (e.g., replace its functionality with the radar sensor readings), the distance measurements of the radar sensor can be used to adjust the output or interpretation of the ultrasound sensor signals in a way that is independent of certain environmental factors like humidity.

More specifically, environmental temperature may be a primary influence on ultrasonic range measurements. The formula defining the speed of sound as a function of temperature is $$c(T) = 13{,}044\sqrt{1 + \frac{T}{273}}, \qquad (1)$$

where T is in degrees Celsius. As such, with the radar, not only can the ultrasound range measurement be calibrated, but the ambient temperature can be indirectly measured if the speed is known relative to the distance measured by the radar compared to that of the ultrasonic sensor. The ambient temperature may be defined by the equation $$T = 273 \times \left[ \left( \frac{2D}{13{,}044 tt} \right)^2 - 1 \right], \qquad (2)$$

where D is the distance measured by the radar and tt is the total travel time measured by the ultrasound. In addition, consider that ultrasound systems allow a window of time where the measurements are made as well as a window of expected signal strength echoed from objects. Typically, the distances are at least four inches away from the sensor and up to, e.g., four meters away. If the signal speed is reduced because the temperature drops or increases such that the echoes are received outside this available range measurement, the data is lost. Similarly, humidity attenuates the signal, and for systems in the 40 kHz range, the highest attenuation occurs at approximately 50% humidity. Hence, the humidity could mask the return signal and no data is produced because it is considered noise. Therefore, the radar sensor can be used to determine not only the distance but the confirmation that there is an object that should have been detected, which effectively modifies the window used by the ultrasound to "measure" such objects. Similar effects occur for barometric pressure and with particles in the air like dust and can be compensated for in similar fashions.

Accordingly, an example vehicle system that can adjust ultrasound sensor readings for environmental factors, such as humidity, includes a processor programmed to receive a first distance signal output by a radar sensor and calibrate an ultrasound sensor in accordance with the first distance signal output by the radar sensor. An example method includes receiving a first distance signal output by a radar sensor, receiving a second distance signal output by an ultrasound sensor, and calibrating the ultrasound sensor in accordance with the first distance signal output by the radar sensor.

Further, a single radar sensor can be used to calibrate multiple ultrasound sensors. The ambient temperature, humidity, and pressure is likely to be the same for all ultrasound sensors located on a vehicle. That is, the compensation factor developed to calibrate one ultrasound sensor may be applied to other ultrasound sensors located on the vehicle. Thus, ultrasound sensors located on, e.g., the side of the vehicle may be calibrated by the distance measurements of a radar sensor located, e.g., at the front or rear of the vehicle.

Moreover, although discussed in the context of radar sensors, a similar concept may be applied to other types of sensors such as lidar sensors, vision sensors, or any other type of sensor that is less affected by environmental factors than an ultrasound sensor.

The elements shown may take many different forms and include multiple and/or alternate components and facilities. The example components illustrated are not intended to be limiting. Indeed, additional or alternative components and/ or implementations may be used. Further, the elements shown are not necessarily drawn to scale unless explicitly stated as such.

As illustrated in FIG. 1, the host vehicle 100 includes an ultrasound sensor 105, a radar sensor 110, and a vehicle system 115 for compensating for environmental factors that may affect various sensor readings, such as readings taken by the ultrasound sensor 105. The environmental factors that may affect the readings taken by the ultrasound sensor 105 may include humidity, temperature, barometric pressure, etc. Readings taken by the radar sensor 110 may not be affected by those same environmental factors. Therefore, the vehicle system 115 may use readings from the radar sensor 110 to calibrate or correct the readings taken by the ultrasound sensor 105.

For example, the vehicle system 115 may consider distance signals output by the ultrasound sensor 105 and radar sensor 110. The distance signals may represent a distance of the respective sensors to the same object. The vehicle system 115 may compare the distance signals. If the distance signals are different, the vehicle system 115 may determine that the distance signal output by the ultrasound sensor 105 has been affected by environmental factors. In this case, the vehicle system 115 may determine and apply a correction factor that, when applied to the distance signal output by the ultrasound sensor 105, adjusts the distance signal to represent the same distance as that measured by the radar sensor 110. Since the radar sensor 110 can measure the distance independent of the environmental factors, applying the correction factor means that the ultrasound sensor 105 is similarly immune to the environmental factors. Accordingly, the vehicle system 115 may calibrate the ultrasound sensor 105 in accordance with the distance signal output by the radar sensor 110.

Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle that operates in an autonomous (e.g., driverless) mode, a partially autonomous mode, and/or a non-autonomous mode.

Figure 2:
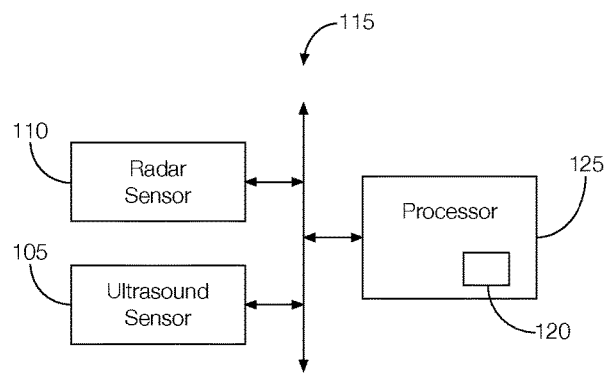
FIG. 2 is a block diagram of example components of the vehicle system of FIG. 1.

Referring now to FIG. 2, the vehicle system 115 includes the ultrasound sensor 105, the radar sensor 110, a memory 120, and a processor 125. Some or all of these components may be in communication with each other over a communication link, such as a Controller Area Network (CAN) bus, Ethernet, or the like.

The ultrasound sensor 105 may include any number of electronic components that, when combined, can use sound waves to measure a distance to an object. The ultrasound sensor 105 may measure the distance to the object by transmitting a sound wave toward the object and receiving a reflected sound wave after the sound wave is reflected off the object toward the ultrasound sensor 105. The ultrasound sensor 105 may include an internal processor that calculates the distance to the object based on the speed of sound and the amount of time between transmitting the sound wave and receiving the reflected sound wave. The ultrasound sensor 105 may output a distance signal representing the distance measurement.

The radar sensor 110 may include any number of electronic components that, when combined, can use radio frequency waves to measure a distance to an object. The radar sensor 110 may transmit the radio frequency waves toward the object and receives echoes (e.g., reflected radio waves) that bounce off the object and reflect toward the radar sensor 110. The radar sensor 110 may include an internal processor that calculates the distance to the object based on, e.g., the speed of light and the amount of time between transmitting the radio frequency wave and receiving the echo. This may be referred to as a direct propagation method. An indirect propagation method may include an internal processor that calculates the distance based on a modulated signal transmitted and reflected off the object. The difference in the frequency of the received signal may be used to determine the distance as well as the relative speed of the object.

The memory 120 may include any number of electronic devices that can store data. For instance, the memory 120 may store distance measurements taken by the ultrasound sensor 105, the radar sensor 110, or both. Moreover, the memory 120 may store data determined by the processor 125 such as any correction factors calculated by the processor 125.

The processor 125 may include any number of electronic components programmed to calibrate the ultrasound sensor 105 according to the distance measurements taken by the radar sensor 110. For instance, the processor 125 may receive the distance signals output by the ultrasound sensor 105 and radar sensor 110. The processor 125 may be programmed to compare the distances represented by the two signals and determine a correction factor based on the difference between the two distances. The correction factor may include a ratio of the distance measured by the radar sensor 110 to the distance measured by the ultrasound sensor 105. Thus the correction factor may often be a number less than one, approximately equal to one, or greater than one but smaller than, e.g., two. More complex relationships may also be developed, especially over time. For example, the correction factor may include a multiplying constant "a" and an offset "b" thereby taking the form of "ax+b". The calibration factor may alternatively be determined via a best fit analysis of the collected data. The correction factor may be stored in the memory 120.

The processor 125 may calibrate the ultrasound sensor 105 by applying the correction factor to future distance signals output by the ultrasound sensor 105. For instance, after determining the correction factor, and upon receipt of a subsequent distance signal output by the ultrasound sensor 105, the processor 125 may be programmed to extract the distance from the distance signal, access the correction factor from the memory 120, and multiply the distance extracted from the distance signal by the correction factor to calculate an adjusted distance. If the environmental factors have not changed, the adjusted distance should be approximately equal to the distance to the same object as measured by the radar sensor 110.

Figure 3:
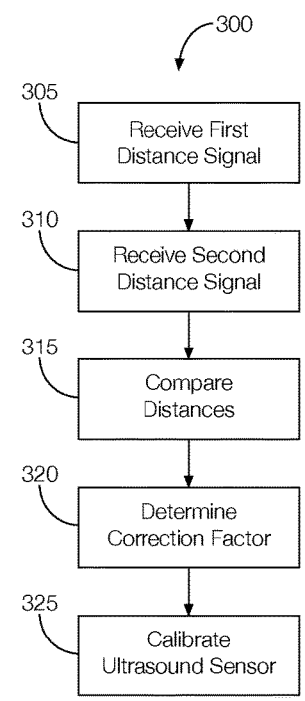
FIG. 3 is a flowchart of an example process that may be executed by the vehicle system.

FIG. 3 is a flowchart of an example process 300 that may be executed by the vehicle system 115 to calibrate the ultrasound sensor 105 according to distance data received from the radar sensor 110. The process 300 may be executed at any time, such as while the host vehicle 100 is running. In some possible approaches, the process 300 may be executed at the beginning of each key-on cycle. In other implementations, the process 300 may be executed once every predetermined amount of key-on cycles (e.g., once every five key-on cycles). In yet another possible approach, the process 300 may be executed multiple times per key-on cycle so that, e.g., the ultrasound sensor 105 may be continuously calibrated to account for changing environmental factors.

At block 305, the vehicle system 115 may receive a first distance signal. The first distance signal may be output by the radar sensor 110 and received by the processor 125. The processor 125 may process the first distance signal to determine the distance to the object as measured by the radar sensor 110.

At block 310, the vehicle system 115 may receive a second distance signal. The second distance signal may be output by the ultrasound sensor 105 and received by the processor 125. The processor 125 may process the second distance signal to determine the distance to the object as measured by the ultrasound sensor 105.

At block 315, the vehicle system 115 may compare the distances measured. For instance, the processor 125 may compare the distance to the object as measured by the radar sensor 110 to the distance to the object as measured by the ultrasound sensor 105. If the distances measured are different by a predetermined amount (e.g., more than 1%), the processor 125 may determine that a correction factor is needed to compensate for environmental factors that may have affected the measurement taken by the ultrasound sensor 105.

At block 320, the vehicle system 115 may determine the correction factor based on the difference between the measurements taken by the ultrasound sensor 105 and radar sensor 110. To determine the correction factor, the processor 125 may determine a ratio of the distance measured by the radar sensor 110 to the distance measured by the ultrasound sensor 105. Thus, the correction factor may often be a number less than one, approximately equal to one, or greater than one but smaller than, e.g., two.

At block 325, the vehicle system 115 may calibrate the ultrasound sensor 105. Calibrating the ultrasound sensor 105 may include the processor 125 applying the correction factor to future readings taken by the ultrasound sensor 105. Calibrating the ultrasound sensor 105 is discussed in more detail below with respect to FIG. 4.

In one possible implementation, a process similar to that described above with respect to FIG. 3 may be used to calibrate ultrasound sensors 105 at the time of production. Thus, the accuracy of a new ultrasound sensor 105 can be evaluated and corrected before the ultrasound sensor 105 is shipped for use in, e.g., a vehicle or other implementation.

Figure 4:
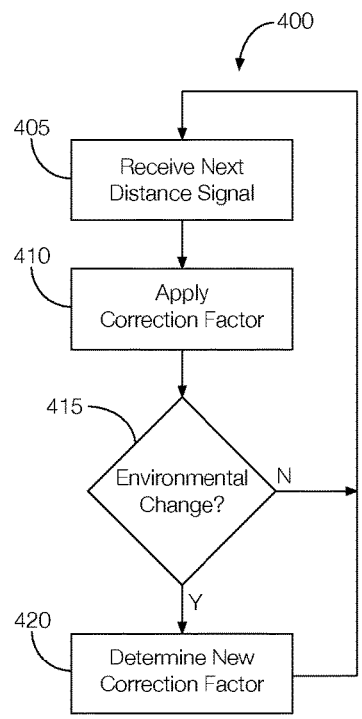
FIG. 4 is a flowchart of another example process that may be executed by the vehicle system.

FIG. 4 illustrates a flowchart of an example process 400 that may be implemented to calibrate the ultrasound sensor 105 according to the correction factor. The process 400 may be implemented, for example, at block 325 of the process 300 discussed above with reference to FIG. 3.

At block 405, the vehicle system 115 may receive a subsequent distance signal output by the ultrasound sensor 105. This subsequent signal may be later in time than the first distance signal, output by the radar sensor 110, and the second distance signal, output by the ultrasound sensor 105. The subsequent signal may be transmitted from the ultrasound sensor 105 to the processor 125 via, e.g., the communication link.

At block 410, the vehicle system 115 may apply the correction factor. As discussed above with respect to the process 300, the processor 125 may determine the correction factor based on the difference between the distances to a particular object as measured by the ultrasound sensor 105 and the radar sensor 110. The processor 125, at block 410, may apply the correction factor to the subsequent distance signal output by the ultrasound sensor 105 and received at block 405. In one possible implementation, applying the correction factor may include multiplying the distance extracted from the subsequent distance signal by the correction factor, resulting in the adjusted distance.

At decision block 415, the vehicle system 115 may determine whether an environmental change has occurred. For instance, the processor 125 may receive an output by, e.g., a humidity sensor, a temperature sensor, a pressure sensor, etc., indicating a change in the ambient environment near the vehicle. If such a change has occurred, the process 400 may proceed to block 420. Absent such changes, the process 400 may proceed to block 405 so that the correction factor may be applied to further distance signals output by the ultrasound sensor 105. In some instances, the correction factor may be verified in accordance with actual humidity, temperature, or pressure measurements since humidity, temperature, and pressure can be mathematically related to distance.

At block 420, the vehicle system 115 may determine a new correction factor. The new correction factor may be determined to account for the change in the environmental factor identified at block 415. To determine the new correction factor, the processor 125 may receive distance signals output by the radar sensor 110 and the ultrasound sensor 105, compare the signals, and generate the new correction factor based on the distances measured by the radar sensor 110 and ultrasound sensor 105 to the same object. The process 400 may proceed to block 405 so the new correction factor can be applied to subsequent distance measurements taken by the ultrasound sensor 105.

The process 400 may continue to execute so long as the vehicle is running.

Figure 5:
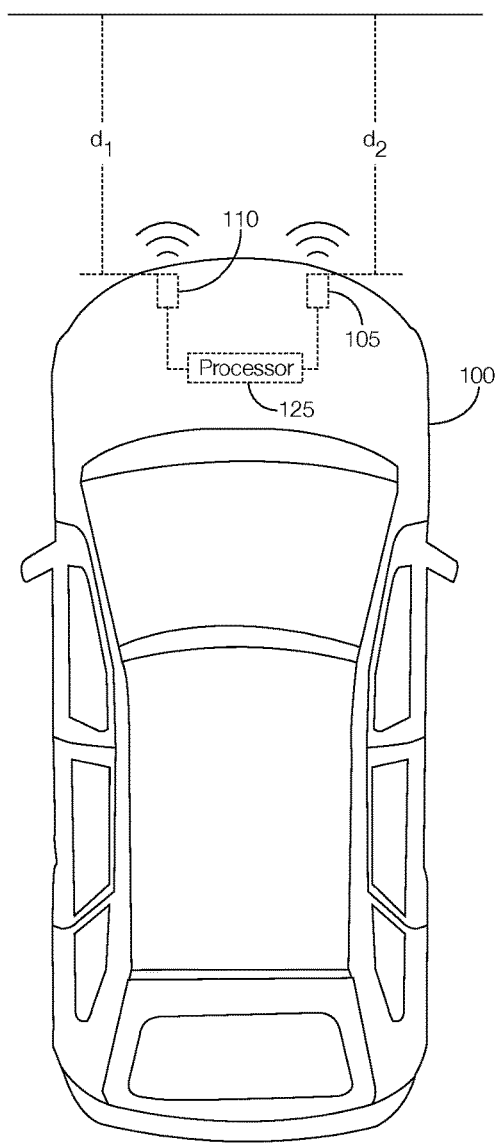
FIG. 5 is an overhead view of sensors measuring the same distance with different results.

Referring now to FIG. 5, the host vehicle 100 is shown with both the ultrasound sensor 105 and radar sensor 110. Both may be near the front of the host vehicle 100. Further, both the ultrasound sensor 105 and the radar sensor 110 may be located along approximately the same plane. Therefore, the ultrasound sensor 105 and radar sensor 110 may be the same distance from an object ahead of the host vehicle 100.

The distances measured by the ultrasound sensor 105 and radar sensor 110 are shown in FIG. 5. For instance, the distance $d_1$ may represent the distance measured by the radar sensor 110 and the distance $d_2$ may represent the distance measured by the ultrasound sensor 105. Even though the distances $d_1$ and $d_2$ are approximately equal, as discussed above, environmental factors may cause the output of the ultrasound sensor 105 to represent a different distance than the output of the radar sensor 110. Applying the correction factor to the signals output by the ultrasound sensor 105 compensates for that issue.

FIGS. 6A and 6B illustrate example tables that show how environmental factors may affect the output of the ultrasound sensor 105 and how the correction factor may be applied to overcome such issues. For instance, in one possible implementation where the distance measured by the ultrasound sensor 105 is 5% greater than the distance measured by the radar sensor 110, the processor 125 may calculate the correction factor to be 0.95. As shown in the final column of FIG. 6A, applying the correction factor makes the calibrated ultrasound distance the same as the distance measured by the radar sensor 110.

FIG. 6B illustrates another approach where the environmental factor changes during operation of the host vehicle 100. In this example, the distance to the object ahead of the host vehicle 100 is 1-1.2 meters ahead of the host vehicle 100 at various times. Initially, the ultrasound sensor 105 measures distances approximately 5% greater than the radar sensor 110. Therefore, the correction factor starts at approximately 0.95. After the third iteration, however, the ultrasound sensor 105 starts measuring distances approximately 7% greater than the radar sensor 110. Therefore, the change in the environmental factor is detected, and the correction factor is adjusted to approximately 0.93. The tables illustrated in FIGS. 6A and 6B are merely examples. The distance measurements and correction factors shown in the tables have been rounded for purposes of clarity and simplicity.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a processor having a memory, wherein the processor is programmed to receive a first distance signal representing a distance measured by a radar sensor, determine a correction factor for a distance measured by an ultrasound sensor based on the distance measured by the radar sensor, and calibrate the ultrasound sensor in accordance with the distance measured by the radar sensor by applying the correction factor to a distance measured by the ultrasound sensor,
wherein applying the correction factor to the output of the ultrasound sensor includes multiplying a distance measured by the ultrasound sensor by the correction factor.

2. The vehicle system of claim 1, wherein the processor is programmed to receive a second distance signal output by the ultrasound sensor, the second distance signal representing the distance measured by the ultrasound sensor.

3. The vehicle system of claim 2, wherein the processor is programmed to compare the first distance signal to the second distance signal and determine the correction factor based on a difference between the distances represented by the first distance signal and the second distance signal.

4. The vehicle system of claim 3, wherein the processor is programmed to calibrate the ultrasound sensor by applying the correction factor to a third distance signal output by the ultrasound sensor.

5. The vehicle system of claim 4, wherein the third distance signal output by the ultrasound sensor is received by the processor after the first distance signal output by the radar sensor and after the second distance signal output by the ultrasound sensor.

6. A vehicle system comprising:
at least one ultrasound sensor;
a radar sensor;
a processor having a memory, wherein the processor is programmed to receive a first distance signal representing a distance measured by the radar sensor, determine a correction factor for a distance measured by the at least one ultrasound sensor based on the distance measured by the radar sensor, and calibrate the at least one ultrasound sensor in accordance with the first distance signal output by the radar sensor by applying the correction factor to a distance measured by the at least one ultrasound sensor,
wherein applying the correction factor to the output of the at least one ultrasound sensor includes multiplying a distance measured by the at least one ultrasound sensor by the correction factor.

7. The vehicle system of claim 6, wherein the processor is programmed to receive a second distance signal output by the at least one ultrasound sensor, the second distance signal representing the distance measured by the at least one ultrasound sensor.

8. The vehicle system of claim 7, wherein the processor is programmed to compare the first distance signal to the second distance signal and determine correction factor based on a difference between the distances represented by the first distance signal and the second distance signal.

9. The vehicle system of claim 8, wherein the processor is programmed to calibrate the at least one ultrasound sensor by applying the correction factor to a third distance signal output by the at least one ultrasound sensor.

10. The vehicle system of claim 9, wherein the third distance signal output by the at least one ultrasound sensor is received by the processor after the first distance signal output by the radar sensor and after the second distance signal output by the at least one ultrasound sensor.

11. The vehicle system of claim 6, wherein the at least one ultrasound sensor includes a plurality of ultrasound sensors, and wherein each of the plurality of ultrasound sensors is calibrated in accordance with the first distance signal output by the radar sensor.

12. A method comprising:
receiving a first distance signal representing a distance measured by a radar sensor;
receiving a second distance signal representing a distance measured by an ultrasound sensor;
determining a correction factor for the distance measured by the ultrasound sensor based on the distance measured by the radar sensor; and
calibrating the ultrasound sensor in accordance with the first distance signal output by the radar sensor by multiplying the distance measured by the ultrasound sensor by the correction factor.

13. The method of claim 12, further comprising comparing the first distance signal to the second distance signal.

14. The method of claim 13, further comprising determining the correction factor based on a difference between the distances represented by the first distance signal and the second distance signal.

15. The method of claim 14, further comprising receiving a third distance signal output by the ultrasound sensor.

16. The method of claim 15, wherein calibrating the ultrasound sensor includes applying the correction factor to the third distance signal output by the ultrasound sensor.

17. The method of claim 16, wherein the third distance signal output by the ultrasound sensor is received after the first distance signal output by the radar sensor and after the second distance signal output by the ultrasound sensor.

* * * * *